United States Patent
Wakhare et al.

(10) Patent No.: US 10,516,583 B1
(45) Date of Patent: Dec. 24, 2019

(54) SYSTEMS AND METHODS FOR MANAGING QUALITY OF SERVICE

(71) Applicant: Veritas Technologies LLC, Mountain View, CA (US)

(72) Inventors: Prasanna Wakhare, Pune (IN); Shailesh Marathe, Pune (IN); Niranjan Pendharkar, Pune (IN); Dhruv Bhatnagar, Pune (IN); Gaurav Bhandarkar, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 322 days.

(21) Appl. No.: 15/471,191

(22) Filed: Mar. 28, 2017

(51) Int. Cl.
G06F 15/173 (2006.01)
H04L 12/24 (2006.01)
H04L 12/26 (2006.01)

(52) U.S. Cl.
CPC ...... *H04L 41/5003* (2013.01); *H04L 43/0852* (2013.01); *H04L 43/16* (2013.01); *H04L 41/0896* (2013.01); *H04L 41/5009* (2013.01)

(58) Field of Classification Search
CPC ............. H04L 41/5003; H04L 41/5009; H04L 41/0896; H04L 43/0852; H04L 43/0888; H04L 43/16
USPC ........................................ 709/223, 224, 226
See application file for complete search history.

(56) References Cited

U.S. PATENT DOCUMENTS

| | | | | |
|---|---|---|---|---|
| 9,465,550 B1 * | 10/2016 | Lippitt | ................... | G06F 3/0613 |
| 2013/0326064 A1 * | 12/2013 | Gulati | ................... | G06F 9/5061 |
| | | | | 709/226 |
| 2015/0081893 A1 * | 3/2015 | Chadwell | .............. | G06F 3/0659 |
| | | | | 709/224 |
| 2015/0312124 A1 * | 10/2015 | Curtin | ..................... | G06F 16/00 |
| | | | | 709/224 |
| 2016/0306644 A1 * | 10/2016 | Kelly | ................... | G06F 9/45558 |
| 2017/0031600 A1 * | 2/2017 | Kesavan | ............... | G06F 3/0605 |

(Continued)

OTHER PUBLICATIONS

Gulati, et al., "PARDA: Proportional Allocation of Resources for Distributed Storage Access", https://pdfs.semanticscholar.org/be4c/6170ee4fd72ff5c8fc92e3d6ba5cba774cf6.pdf.

(Continued)

*Primary Examiner* — Liang Che A Wang
*Assistant Examiner* — Johnny B Aguiar
(74) *Attorney, Agent, or Firm* — FisherBroyles, LLP (57) ABSTRACT

The disclosed computer-implemented method for managing quality of service may include (i) installing, at a network protocol layer, a latency monitoring plug-in that monitors latency at the network protocol layer as distinct from a storage layer beneath the network protocol layer, (ii) providing, by the latency monitoring plug-in, feedback reporting the latency at the network protocol layer to a quality of service engine that monitors characteristics of the storage layer such that the quality of service engine learns about the latency at the network protocol layer, and (iii) adjusting, by the quality of service engine, a calculation of system capacity, based on both the feedback from the latency monitoring plug-in reporting the latency at the network protocol layer and the monitored characteristics of the storage layer to enable an application to adhere to a service level agreement. Various other methods, systems, and computer-readable media are also disclosed.

20 Claims, 4 Drawing Sheets

(56) References Cited

U.S. PATENT DOCUMENTS

2017/0251076 A1* 8/2017 Bellur .................. H04L 67/322
2017/0346760 A1* 11/2017 Kelly .................. H04L 67/1097

OTHER PUBLICATIONS

Zhu, et al., "PriorityMeister: Tail Latency QoS for Shared Networked Storage", http://www.cs.cmu.edu/~harchol/Papers/PriorityMeister.pdf.

* cited by examiner

SYSTEMS AND METHODS FOR MANAGING QUALITY OF SERVICE

BACKGROUND

In a software defined storage environment, a quality of service engine may monitor the characteristics of a storage layer to detect perceived delays, and other issues, which may adversely affect the performance of underlying storage. Additionally, in this environment, if the protocol layer is slower than the underlying storage then the induced delays will affect the performance of guest virtual machines. Examples of the protocol layer may correspond to protocols or specifications for the QUICK EMULATOR hypervisor and/or the NETWORK BLOCK DEVICE, as discussed further below. In addition to the delays affecting the performance of the guest virtual machines, the quality of service engine also may be unable to gauge the capacity of the entire system.

For example, if characteristics of the storage layer are behaving as expected by the quality of service engine, but the protocol layer itself is slow and is inducing significant delays in a critical I/O path, then the performance of guest virtual machines will be affected adversely. This adverse effect will occur even when the quality of service engine is otherwise providing sufficient capacity to the entire system. In other words, the quality of service engine may be effectively unaware of delays, or latency issues, at one or more protocol layers above the storage layer that the quality of service engine monitors. In view of the above, the instant disclosure, therefore, identifies and addresses a need for improved systems and methods for managing quality of service.

SUMMARY

As will be described in greater detail below, the instant disclosure describes various systems and methods for managing quality of service. In one example, a computer-implemented method for managing quality of service may include (i) installing, at a network protocol layer, a latency monitoring plug-in that monitors latency at the network protocol layer as distinct from a storage layer beneath the network protocol layer, (ii) providing, by the latency monitoring plug-in, feedback reporting the latency at the network protocol layer to a quality of service engine that monitors characteristics of the storage layer beneath the network protocol layer such that the quality of service engine learns about the latency at the network protocol layer, and (iii) adjusting, by the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer.

In one embodiment, the feedback reports an average latency for a multitude of workloads to the quality of service engine. In some examples, adjusting the calculation further may include (i) calculating a network capacity based on the latency at the network protocol layer as latency perceived by the application and (ii) calculating a storage capacity based on the monitored characteristics at the storage layer.

In some examples, the computer-implemented method may further include selecting the minimum between the network capacity and the storage capacity as the system capacity to enable the application to adhere to the service level agreement despite the latency at the network protocol layer. In one embodiment, the latency at the network protocol layer is induced by an I/O path at the network protocol layer.

In one embodiment, the network protocol layer corresponds to one of the following specifications: (i) the QUICK EMULATOR hypervisor, (ii) the NETWORK BLOCK DEVICE, (iii) the INTERNET SMALL COMPUTER SYSTEMS INTERFACE, and (iv) the NETWORK FILE SYSTEM. In one embodiment, the application corresponds to a guest virtual machine of a hypervisor. In one embodiment, the storage layer corresponds to storage shared by multiple guest virtual machines of the hypervisor. In one embodiment, an administrator specifies the latency tolerance for the guest virtual machine and/or the quality of service engine learns the latency tolerance for the guest virtual machine.

In one embodiment, a previous inability of the quality of service engine to learn about the latency at the network protocol layer creates a potential noisy neighbor problem, according to a statistical latency analysis, when a neighbor consumes a network resource beyond a threshold. Additionally, in this embodiment, providing, by the latency monitoring plug-in, feedback reporting the latency at the network protocol layer to the quality of service engine such that the quality of service engine learns about the latency at the network protocol layer effectively solves the potential noisy neighbor problem.

In one embodiment, a system for implementing the above-described method may include (i) an installation module, stored in memory, that installs, at a network protocol layer, a latency monitoring plug-in that monitors latency at the network protocol layer as distinct from a storage layer beneath the network protocol layer, (ii) a provisioning module, stored in memory, that provides, through the latency monitoring plug-in, feedback reporting the latency at the network protocol layer to a quality of service engine that monitors characteristics of the storage layer beneath the network protocol layer such that the quality of service engine learns about the latency at the network protocol layer, (iii) an adjusting module, stored in memory, that adjusts, as part of the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer, and (iv) at least one physical processor configured to execute the installation module, the provisioning module, and the adjusting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) install, at a network protocol layer, a latency monitoring plug-in that monitors latency at the network protocol layer as distinct from a storage layer beneath the network protocol layer, (ii) provide, by the latency monitoring plug-in, feedback reporting the latency at the network protocol layer to a quality of service engine that monitors characteristics of the storage layer beneath the network protocol layer such that the quality of service engine learns about the latency at the network protocol layer, and (iii) adjust, by the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing quality of service. The disclosed systems and methods may generally improve upon related quality of service engines by providing feedback information about latency at one or more network protocol layers, above a storage layer, such that the quality of service engines effectively learn about latency of which these engines were previously unaware. The inability of these quality of service engines to learn about latency at the one or more network protocol layers introduced noisy neighbor problems, as discussed further below, where one or more neighbors consumed excessive network resources, and the quality of service engine was unable to effectively address these noisy neighbor problems, because the quality of service engine was unaware of the latency above the storage layer. In other words, related quality of service engines focused their latency monitoring on the storage layer and, therefore, were previously unaware of one or more instances of latency above the storage layer. The ability of quality of service engines to learn about the instances of latency above the storage layer enable the quality of service engines to effectively address and resolve the noisy neighbor problem, as discussed further below.

Figure 1:
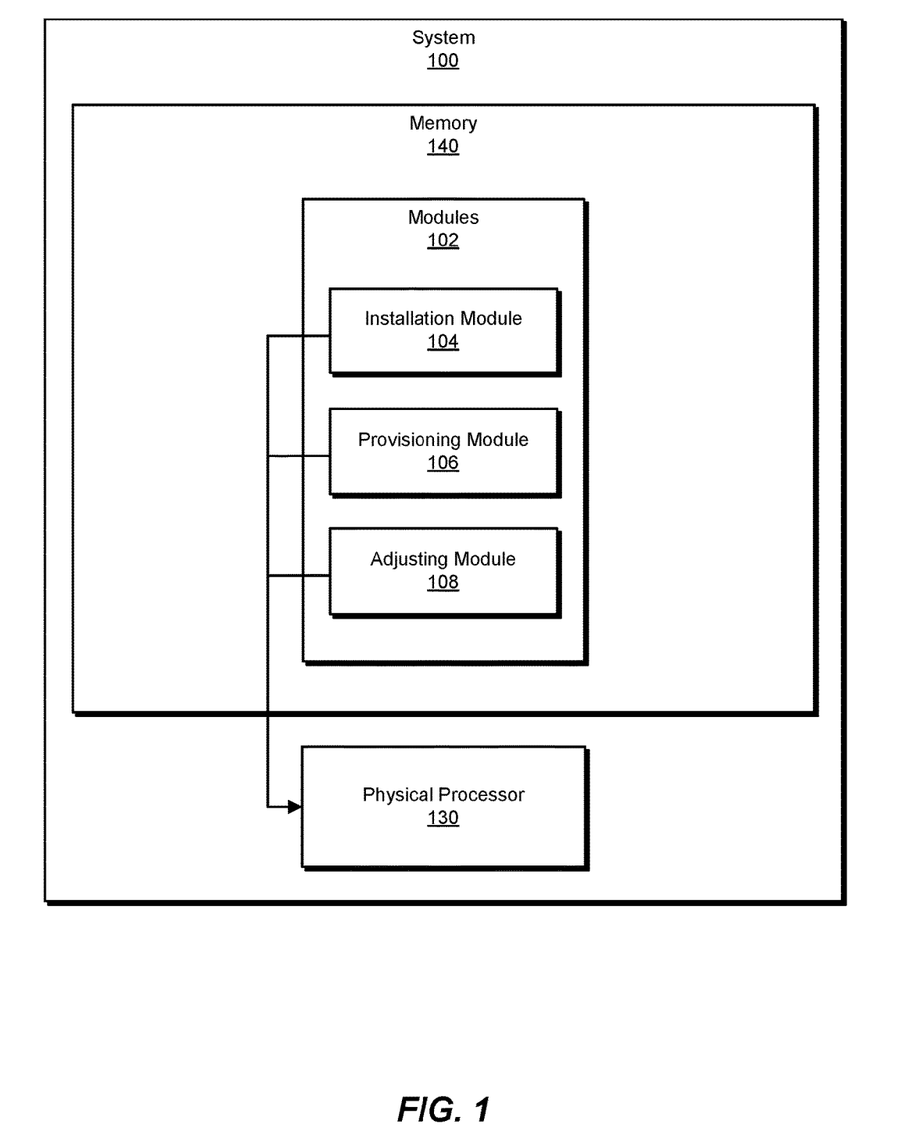
FIG. 1 is a block diagram of an example system for managing quality of service.
Figure 2:
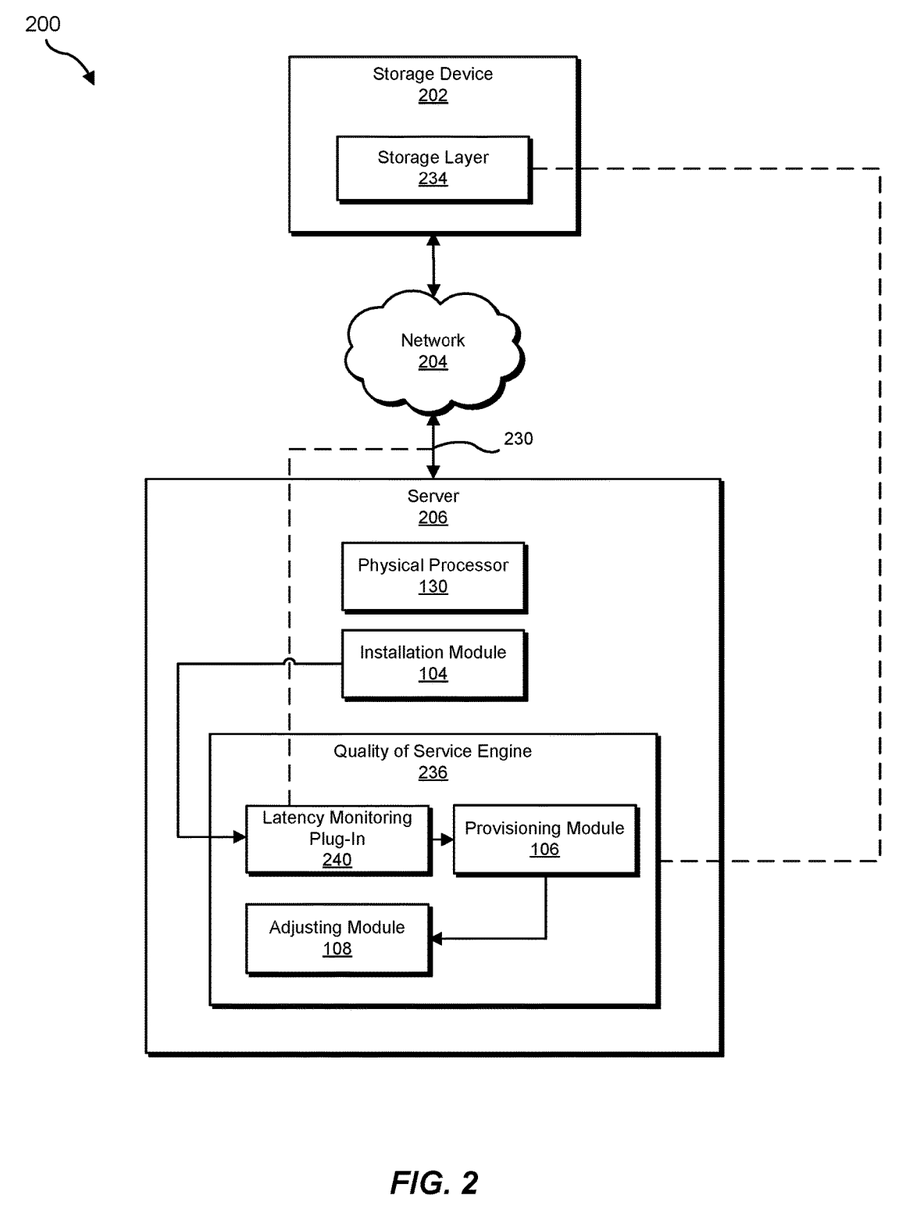
FIG. 2 is a block diagram of an additional example system for managing quality of service.

The following will provide, with reference to FIGS. 1-2, detailed descriptions of example systems for managing quality of service. Detailed descriptions of corresponding computer-implemented methods will also be provided in connection with FIGS. 3-4.

FIG. 1 is a block diagram of example system 100 for managing quality of service. As illustrated in this figure, example system 100 may include one or more modules 102 for performing one or more tasks. For example, and as will be explained in greater detail below, example system 100 may include an installation module 104 that installs, at a network protocol layer, a latency monitoring plug-in that monitors latency at the network protocol layer as distinct from a storage layer beneath the network protocol layer. Example system 100 may additionally include a provisioning module 106 that provides, through the latency monitoring plug-in, feedback reporting the latency at the network protocol layer to a quality of service engine that monitors characteristics of the storage layer beneath the network protocol layer such that the quality of service engine learns about the latency at the network protocol layer. Example system 100 may also include an adjusting module 108 that adjusts, as part of the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., storage device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing quality of service. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a storage device 202 in communication with a server 206 via a network 204. In one example, all or a portion of the functionality of modules 102 may be performed by storage device 202, server 206, and/or any other suitable computing system. As will be described in greater detail below, one or more of modules 102 from FIG. 1 may, when executed by at least one processor of storage device 202 and/or server 206, enable storage device 202 and/or server 206 to manage quality of service.

For example, installation module 104 may install, at a network protocol layer 230, a latency monitoring plug-in 240 that monitors latency at network protocol layer 230 as distinct from a storage layer 234 beneath network protocol layer 230. Additionally, provisioning module 106 may provide, through latency monitoring plug-in 240, feedback reporting the latency at network protocol layer 230 to a quality of service engine 236 that monitors characteristics of storage layer 234 beneath network protocol layer 230 such that quality of service engine 236 learns about the latency at network protocol layer 230. Furthermore, adjusting module 108 may adjust, as part of quality of service engine 236, a calculation of system capacity, based on both the feedback from latency monitoring plug-in 240 reporting the latency at network protocol layer 230 and the monitored characteristics of storage layer 234 beneath network protocol layer 230 to enable an application to adhere to a service level agreement despite the latency at network protocol layer 230.

Storage device 202 generally represents any type or form of computing device or storage device that may provide long-term storage in a network computing environment. In one example embodiment, storage device 202 may provide a shared storage for usage by a multitude of guest virtual machines that are managed by at least one hypervisor. In some examples, storage device 202 may correspond to tape storage, network storage, a storage array, storage of a storage area network, software-defined storage, virtualized storage, cloud storage, and/or a deduplication storage. In some examples, one or more guest applications or virtual machines may be configured to access storage device 202 through one or more of the following protocols or specifications: the QUICK EMULATOR hypervisor, the NETWORK BLOCK DEVICE, the INTERNET SMALL COMPUTER SYSTEMS INTERFACE, and the NETWORK FILE SYSTEM. In some examples, storage device 202 may constitute part of a larger computing device, which may correspond to one or more laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of performing, or facilitating, some or all of method 300, as discussed further below. In some examples, server 206 may include the hypervisor that manages the one or more guest virtual machines, as discussed above. In some example, server 206 may simply constitute a management server that performs some or part of method 300 to improve the performance of a quality of service engine as discussed further below. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between storage device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. In some examples, network 204 may correspond to a virtual network configured through a hypervisor.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
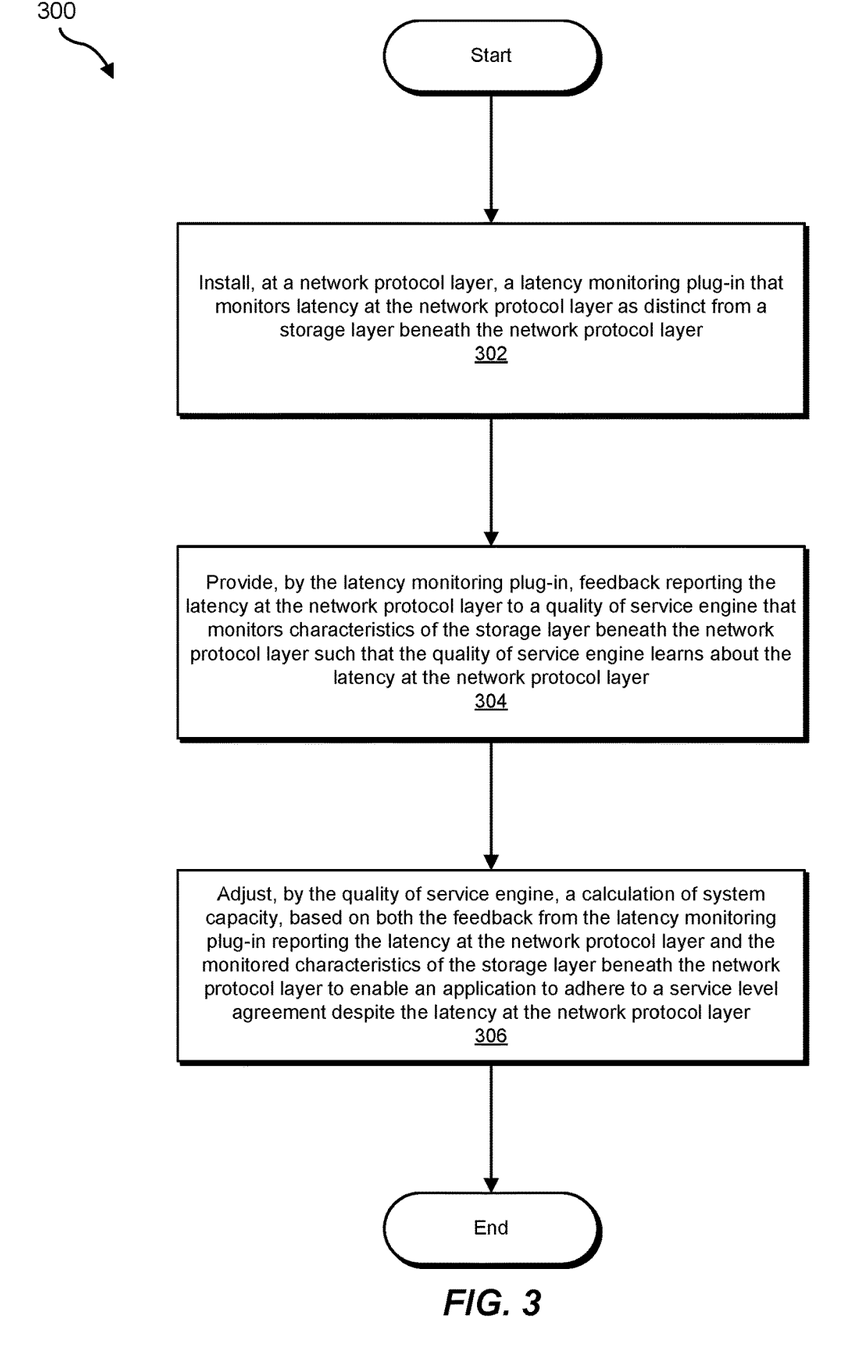
FIG. 3 is a flow diagram of an example method for managing quality of service.

FIG. 3 is a flow diagram of an example computer-implemented method 300 for managing quality of service. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may install, at a network protocol layer, a latency monitoring plug-in that monitors latency at the network protocol layer as distinct from a storage layer beneath the network protocol layer. For example, installation module 104 may, as part of server 206 in FIG. 2, install, at network protocol layer 230, latency monitoring plug-in 240 that monitors latency at network protocol layer 230 as distinct from storage layer 234 beneath network protocol layer 230.

As used herein, the phrase "install, at a network protocol layer," generally refers to installing or configuring the latency monitoring plug-in in a manner that enables the plug-in to plug into monitor latency at the network protocol layer. In terms of physical memory, the plug-in may be located within memory of server 206 and/or storage device 202.

As used herein, the term "network protocol layer" generally refers to a layer, according to a network model, such as the OPEN SYSTEMS INTERCONNECTION model, that is located higher than a storage layer, as discussed further below. In some examples, the network protocol layer may correspond to a transport layer, an Internet layer, and/or a link layer. Additionally, or alternatively, the network protocol layer may correspond to a presentation layer, a session layer, a network layer, and/or a data link layer of the OPEN SYSTEMS INTERCONNECTION model. In some examples, the network protocol layer may correspond to any layer that is higher than a storage layer or a physical layer within the network model. In some examples, the network protocol layer and the storage layer may be related in terms of nested or encapsulated portions within network packets and/or in terms of the chronology of nesting or encapsulating portions of these network packets. For example, a physical layer may encapsulate data within the higher-level layers within the OPEN SYSTEMS INTERCONNECTION model. In general, the direction of "higher" or "lower" within the network model may refer to the conventional or established usage of these terms within the art.

In one embodiment, the network protocol layer corresponds to one of the following specifications: (i) the QUICK EMULATOR hypervisor (which may interface with a non-virtual network and/or establish its own virtual network between virtual resources such as guest virtual machines), (ii) the NETWORK BLOCK DEVICE, (iii) the INTERNET SMALL COMPUTER SYSTEMS INTERFACE, and (iv) the NETWORK FILE SYSTEM. These last three examples may provide a network interface for connecting a storage device to a computing device through a corresponding network, such as network 204 (e.g., a wide area network connected to a remote storage device, as in cloud or Internet storage).

As used herein, the term "storage layer" generally refers to a lower level, or a more hardware-oriented level, than the network protocol layer, that is directed to the reading and writing of data to storage device 202, as discussed further above. In some examples, the storage may correspond to the physical layer of the OPEN SYSTEMS INTERCONNECTION model. In one embodiment, the storage layer corresponds to storage shared by multiple guest virtual machines of the hypervisor. Additionally, as used herein, the term "plug-in" generally refers to the conventional sense of an add-on software component or module that is inserted into a preexisting network or computing system to add specific functionality (e.g., monitoring latency, as discussed above).

In view of the above, in some examples, latency at the network protocol layer may correspond to latency caused by network congestion, faults or failures of network computing devices, and/or excessive application usage or consumption of network resources, etc. In one specific example, latency at the network protocol layer may be induced by an I/O path at the network protocol layer (e.g., latency in terms of writing or reading data at the network protocol layer). In contrast, latency at the storage layer may correspond to latency in terms of congestion, faults, failures, and/or overuse of storage resources (e.g., disks or memory units) at storage device 202.

Installation module 104 may install the latency monitoring plug-in in a variety of ways. In general, installation module 104 may install the latency monitoring plug-in in any manner that suitably enables the plug-in to monitor latency at the network protocol layer, as discussed above. In some examples, installation module 104 may write the plug-in to a stack for a hosted hypervisor that performs hardware virtualization and/or a hosted virtual machine monitor. In one specific example, HYPERSCALE may provide a written plug-in for the QUICK EMULATOR hypervisor that monitors latency at the network protocol layer, as discussed above.

Returning to FIG. 3, at step 304, one or more of the systems described herein may provide, through the latency monitoring plug-in, feedback reporting the latency at the network protocol layer to a quality of service engine that monitors characteristics of the storage layer beneath the network protocol layer such that the quality of service engine learns about the latency at the network protocol layer. For example, provisioning module 106 may, as part of server 206 in FIG. 2, provide, through the latency monitoring plug-in, feedback reporting the latency at network protocol layer 230 to a quality of service engine that monitors characteristics of storage layer 234 beneath network protocol layer 230 such that quality of service engine 236 learns about the latency at network protocol layer 230.

As used herein, the term "quality of service engine" or controller generally refers to an engine (e.g., in hardware, software, firmware, or a virtual resource) that attempts to provide a desired level of network or storage performance through traffic prioritization and/or resource reservation control mechanisms. For example, the quality of service engine may provide different priorities to different applications, users, or data flows, and the engine may guarantee a certain level of performance to a dataflow. The quality of service engine may perform one or more of these operations in an attempt to satisfy a service level agreement or other specification of nominal or desired performance.

As used herein, the phrase "monitors characteristics of the storage layer" generally refers to the quality of service engine monitoring characteristics or attributes of the performance of storage device 202, such as latency levels, stored data and empty space levels, consumption levels in terms of time, energy, and/or storage capacity, etc., including deviations from historical, average, expected, desired, and/or predicted levels (e.g., in terms of a service level agreement or other specification of performance). Additionally, as used herein, the phrase "learns about the latency at the network protocol layer" generally refers to the quality of service engine switching from a state of ignorance to a state of knowledge about the latency at the network protocol layer (e.g., discovering the latency such that the quality of service engine is able to factor the newly discovered knowledge into quality of service operations, such as network or storage prioritization and/or resource reservation operations, as discussed further above).

Provisioning module 106 may provide the feedback to the quality of service engine in a variety of ways. In some examples, provisioning module 106 may transmit a network packet to the quality of service engine over a network, such as network 204. Additionally or alternatively, provisioning module 106 may transmit the feedback using one or more frames or items of data over a computing device bus (e.g., in embodiments where provisioning module 106 and quality of service engine 236 are located on a same computing device, such as server 206, and connected by a bus, such as a motherboard bus). Additionally or alternatively, provisioning module 106 may transmit the feedback through any suitable inter-process sharing mechanism provided by a hypervisor or operating system. In general, provisioning module 106 may provide the feedback to the quality of service engine in any suitable manner that successfully enables the quality of service engine to learn about the feedback and factor the feedback into quality of service operations, as discussed above. Moreover, in one specific embodiment the feedback reports an average latency for a multitude of workloads to the quality of service engine (e.g., where each workload corresponds to an application executing on a guest virtual machine and/or corresponds to the guest virtual machine itself). In further examples, the feedback may report an average latency computed for each and every application (and/or guest virtual machine) executing on the hypervisor.

At step 306, one or more of the systems described herein may adjust, through the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer. For example, adjusting module 108 may adjust, as part of the quality of service engine, a calculation of system capacity, based on both the feedback from latency monitoring plug-in 240 reporting the latency at network protocol layer 230 and the monitored characteristics of the storage layer beneath network protocol layer 230 to enable an application to adhere to a service level agreement despite the latency at network protocol layer 230.

As used herein, the phrase "adjust a calculation" generally refers to modifying or configuring the computation. Additionally, as used herein, the term "system capacity" generally refers to a total system capacity, or a level of capacity beyond the storage layer, and which includes the capacity of both the network protocol layer and the storage layer. Furthermore, as used herein, the term "service level agreement" generally refers to the conventional sense of a contract or agreement between a service provider and a user or customer that defines the level of service or performance that the customer expects from the service provider. Moreover, as used herein, the term "application" at step 306 generally refers to either a user application executing on an operating system, a user application executing on a guest virtual machine that is further executing on a hypervisor, and/or the guest virtual machine itself.

Adjusting module 108 may adjust the calculation of system capacity in a variety of ways. In general, adjusting module 108 may adjust the calculation by including in, or factoring into, the calculation not just the monitored characteristics of the storage layer, but also the latency detected by the latency monitoring plug-in at the network protocol layer, as discussed above. In other words, adjusting module 108 may adjust the calculation of system capacity by leveraging the insight of the latency at the network protocol layer that was discovered by the latency monitoring plug-in, thereby enabling the quality of service engine to make more informed decisions and potentially address and resolve noisy neighbor problems, as discussed further below. Additionally, after calculating the system capacity, the quality of service engine may base quality of service decisions or operations (e.g., in terms of prioritizing one or more applications, workloads, items of network traffic, and/or network resources, and/or in terms of throttling, calibrating, reserving, and/or locking one or more network resources) on the calculated system capacity to help ensure that the overall system (e.g., system 200) and/or the application achieve, or adhere to, the specified service level agreement.

In one specific embodiment, an administrator may specify the latency tolerance for the guest virtual machine. Additionally, or alternatively, the quality of service engine may learn or discover the latency tolerance for the guest virtual machine. In these examples, the quality of service engine may discover the latency tolerance by adjusting one or more quality of service, resource prioritization, and/or resource reservation settings and then detecting the impact of that adjustment on the application or another part of the overall storage system (e.g., system 200). The quality of service engine may thereby calibrate the latency tolerance, based upon feedback received in response to the adjustment of one or more settings, as described above, to thereby help ensure that the application adheres to the service level agreement.

Figure 4:
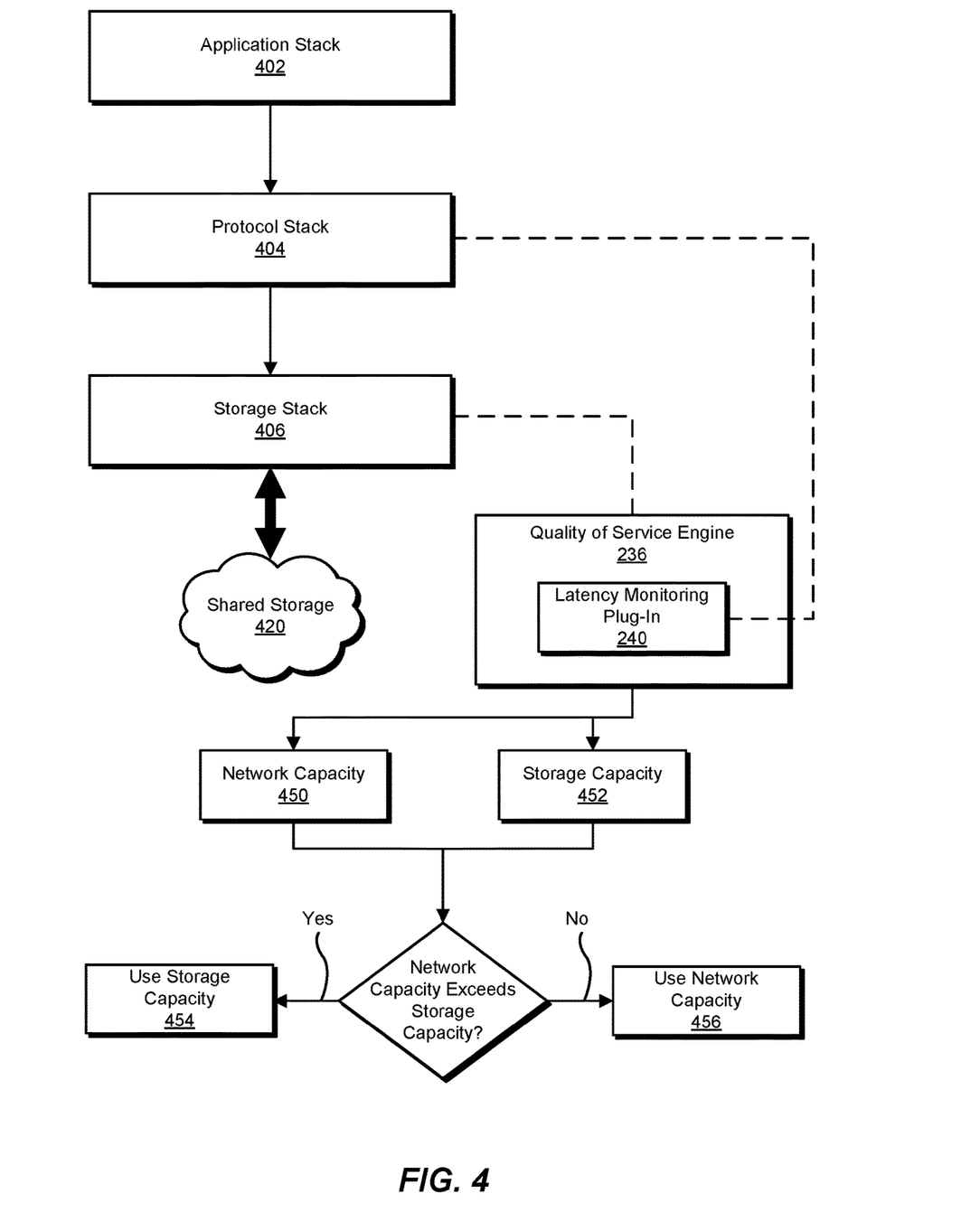
FIG. 4 is a block diagram of an example workflow that further illustrates the operation of a system for managing quality of service.

FIG. 4 shows an example workflow that illustrates an example operation of system 100 and/or system 200, as discussed further below. As shown in this figure, the workflow may include an application stack 402, a protocol stack 404, and a storage stack 406, which interfaces with shared storage 420. Shared storage 420 may correspond to storage device 202, as discussed above. In this example, application stack 402 may optionally correspond to the application layer of the OPEN SYSTEMS INTERCONNECTION network model and related models, such as the TCP/IP network model. Protocol stack 404 may correspond to one or more intermediary levels between application stack 402 and storage stack 406, which may optionally correspond to the physical layer of the OPEN SYSTEMS INTERCONNECTION network model, as discussed above.

As further shown in this figure, in these examples, latency monitoring plug-in 240 may monitor latency at protocol stack 404, which may generally correspond to the network protocol layer discussed above. Moreover, in these examples, latency monitoring plug-in 240 may detect latency that is generated either at protocol stack 404 and/or at application stack 402. Additionally, quality of service engine 236 may continue to monitor characteristics of storage stack 406, which may correspond to storage layer 234 of FIG. 2. Traditionally, quality of service engine 236 may only have awareness of the monitored characteristics at storage stack 406, including latency and other characteristics. Nevertheless, the disclosed systems and methods may improve upon related quality of service engines by the installation of latency monitoring plug-in 240, which may provide detected feedback or information about latency at protocol stack 404 to quality of service engine 236, thereby informing quality of service engine 236 about additional information or latency at protocol stack 404 of which quality of service engine 236 was previously unaware. In other words, in some examples, a previous inability of the quality of service engine to learn about the latency at the network protocol layer creates a potential noisy neighbor problem, according to a statistical latency analysis, when a neighbor consumes a network resource beyond a threshold. Furthermore, the providing by provisioning module 106, through the latency monitoring plug-in, of feedback reporting the latency at the network protocol layer to the quality of service engine may effectively solve the potential noisy neighbor problem.

As further shown in FIG. 4, in some examples, adjusting module 108 may adjust the calculation of system capacity further by calculating a network capacity 450 based on the latency at network protocol layer 230 as latency perceived by the application. Adjustment module 108 may further calculate a storage capacity 452 based on the monitored characteristics at the storage layer. In further examples, adjustment module 108 further adjusts the calculation of system capacity by selecting the minimum between the network capacity and the storage capacity as the system capacity to enable the application to adhere to the service level agreement despite the latency at the network protocol layer. In other words, as shown in FIG. 4, adjustment module 108 may make a decision whether network capacity 450 exceeds storage capacity 452. If the answer to this decision is yes, then adjustment module 108 may use storage capacity 452 at step 454. If the answer to this decision is no, then adjustment module 108 may use network capacity 450 at step 456. Additionally, in some cases, adjustment module 108 may define a default value or tiebreaker decision mechanism in the case where these two values are the same or substantially the same.

The above discussion provides an overview of method 300. Additionally, the following discussion provides a more detailed overview of concrete embodiments of the disclosed systems and methods.

In a typical shared storage environment, there are multiple layers between the application stack and the storage stack. In some traditional systems, the quality of service engine, which may be running in the storage stack, may be unaware of the latency requirements of the application. Moreover, because applications are latency sensitive, an increase in application stack latency would affect overall system performance adversely. More specifically, multiple noisy workloads (e.g., noisy neighbors) may cause performance issues in meeting or satisfying predictable performance for higher priority workloads if there is high latency at the transport layer or protocol layer (e.g., latency at the layer of QUICK EMULATOR, NETWORK BLOCK DEVICE, INTERNET SMALL COMPUTER SYSTEMS INTERFACE, and/or NETWORK FILE SYSTEM communications).

To avoid this problem, and/or various problems associated with related systems, as discussed above, the disclosed systems and methods introduce a feedback mechanism into one or more protocol layers (e.g., layers that correspond to the QUICK EMULATOR hypervisor and/or NETWORK BLOCK DEVICE protocols, specifications, and/or communications) to a quality of service controller. In general, the disclosed systems and methods may address storage service level agreement requirements or specifications in a shared storage environment. As a concrete example of the shared storage environment, a cinder volume may be exported from a storage area network storage such as SOLIDFIRE or NETAPP.

The introduced feedback mechanism makes the quality of service engine aware of the delays induced by the input/output path in the protocol layer (e.g., introduced by clients at the protocol layer). With this information, the quality of service engine will be able to factor in the protocol layer characteristics, in addition to storage layer characteristics, and thereby calculate the capacity for the system (e.g., in terms of the slowest observed behavior) making the application adhere to its service level agreement even when the delay is caused above storage layer.

The disclosed systems and methods propose an innovation to incorporate end-to-end latencies in a software defined storage environment by providing feedback from the protocol layer to the quality of service controller so that the quality of service controller can thereby calculate the capacity of the system in terms of the slowest application. In general, the solution may help obtain predictable performance for higher priority virtual machines in the presence of one or more noisy neighbors even in the case of a shared storage environment.

In one embodiment, the disclosed systems and methods may incorporate protocol layer feedback into the system capacity calculation. A guest application can execute on a software defined storage subsystem with a protocol, or configuration, such as the QUICK EMULATOR hypervisor, the NETWORK BLOCK DEVICE, the INTERNET SMALL COMPUTER SYSTEMS INTERFACE, and the NETWORK FILE SYSTEM. An administrator may specify latency requirements or specifications for one or more workloads, or quality of service engine can dynamically learn them, as discussed above. The quality of service engine may optionally be located within the storage stack. The guest application, and/or the latency monitoring plug-in, may interact with the quality of service engine, which may calculate the system capacity based on the monitored storage characteristics. The protocol layer may provide an average length feedback that is seen across all the guest virtual machines running on a hypervisor to the quality of service engine. In turn, the quality of service engine may calculate the capacity of the system based on the feedback received from the protocol layer (e.g., through the latency monitoring plug-in).

More specifically, the quality of service engine may calculate the network capacity (i.e., the stack capacity) perceived by the application based on the feedback that is received from the protocol layer. The quality of service engine may also calculate the storage capacity based on the monitored characteristics of the storage layer, as discussed above. Because of potential storage stack inadequacy, protocol layer latencies, and/or network round trip time(s), the capacities calculated by the quality of service engine at the two different layers may be different. Accordingly, the quality of service engine may select the minimum of the two calculated capacities to meet or satisfy the service level agreement(s) and furthermore to effectively control one or more instances of the noisy neighbor problem, as discussed above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing quality of service, at least a portion of the method being performed by a computing device comprising at least one processor, the method comprising:
    installing, at a network protocol layer, a latency monitoring plug-in that monitors latency at the network protocol layer as distinct from a storage layer beneath the network protocol layer;
    providing, by the latency monitoring plug-in, feedback reporting the latency at the network protocol layer to a quality of service engine that monitors characteristics of the storage layer beneath the network protocol layer such that the quality of service engine learns about the latency at the network protocol layer; and
    adjusting, by the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer;
    wherein:
    the feedback reports an average latency for a multitude of workloads to the quality of service engine;
    adjusting the calculation further comprises calculating a network capacity based on the latency at the network protocol layer as latency perceived by the application and calculating a storage capacity based on the monitored characteristics of the storage layer; and
    the method further comprises selecting the minimum between the network capacity and the storage capacity as the system capacity to enable the application to adhere to the service level agreement despite the latency at the network protocol layer.

2. The computer-implemented method of claim 1, wherein the network protocol layer corresponds to the QUICK EMULATOR hypervisor.

3. The computer-implemented method of claim 1, wherein the network protocol layer corresponds to the NETWORK BLOCK DEVICE.

4. The computer-implemented method of claim 1, wherein the network protocol layer corresponds to the INTERNET SMALL COMPUTER SYSTEMS INTERFACE.

5. The computer-implemented method of claim 1, wherein the latency at the network protocol layer is induced by an I/O path at the network protocol layer.

6. The computer-implemented method of claim 1, wherein the network protocol layer corresponds to the NETWORK FILE SYSTEM.

7. The computer-implemented method of claim 1, wherein the application corresponds to a guest virtual machine of a hypervisor.

8. The computer-implemented method of claim 7, wherein the storage layer corresponds to storage shared by multiple guest virtual machines of the hypervisor.

9. The computer-implemented method of claim 7, wherein at least one of:
   an administrator specifies a latency tolerance for the guest virtual machine; and
   the quality of service engine learns the latency tolerance for the guest virtual machine.

10. The computer-implemented method of claim 1, wherein:
   a previous inability of the quality of service engine to learn about the latency at the network protocol layer creates a potential noisy neighbor problem, according to a statistical latency analysis, when a neighbor consumes a network resource beyond a threshold; and
   providing, by the latency monitoring plug-in, feedback reporting the latency at the network protocol layer to the quality of service engine such that the quality of service engine learns about the latency at the network protocol layer effectively solves the potential noisy neighbor problem.

11. A system for managing quality of service, the system comprising:
   an installation module, stored in a memory, that installs, at a network protocol layer, a latency monitoring plug-in that monitors latency at the network protocol layer as distinct from a storage layer beneath the network protocol layer;
   a provisioning module, stored in the memory, that provides, through the latency monitoring plug-in, feedback reporting the latency at the network protocol layer to a quality of service engine that monitors characteristics of the storage layer beneath the network protocol layer such that the quality of service engine learns about the latency at the network protocol layer;
   an adjusting module, stored in the memory, that adjusts, as part of the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer; and
   at least one physical processor configured to execute the installation module, the provisioning module, and the adjusting module;
   wherein:
   the feedback reports an average latency for a multitude of workloads to the quality of service engine;
   the adjusting module adjusts the calculation at least in part by calculating a network capacity based on the latency at the network protocol layer as latency perceived by the application and calculating a storage capacity based on the monitored characteristics of the storage layer; and
   the adjusting module selects the minimum between the network capacity and the storage capacity as the system capacity to enable the application to adhere to the service level agreement despite the latency at the network protocol layer.

12. The system of claim 11, wherein the network protocol layer corresponds to the QUICK EMULATOR hypervisor.

13. The system of claim 11, wherein the network protocol layer corresponds to the NETWORK BLOCK DEVICE.

14. The system of claim 11, wherein the network protocol layer corresponds to the INTERNET SMALL COMPUTER SYSTEMS INTERFACE.

15. The system of claim 11, wherein the latency at the network protocol layer is induced by an I/O path at the network protocol layer.

16. The system of claim 11, wherein the network protocol layer corresponds to the NETWORK FILE SYSTEM.

17. The system of claim 11, wherein the application corresponds to a guest virtual machine of a hypervisor.

18. The system of claim 17, wherein the storage layer corresponds to storage shared by multiple guest virtual machines of the hypervisor.

19. The system of claim 17, wherein at least one of:
   an administrator specifies latency tolerance for the guest virtual machine; and
   the quality of service engine learns the latency tolerance for the guest virtual machine.

20. A non-transitory computer-readable medium comprising one or more computer-readable instructions that, when executed by at least one processor of a computing device, cause the computing device to:
   install, at a network protocol layer, a latency monitoring plug-in that monitors latency at the network protocol layer as distinct from a storage layer beneath the network protocol layer;
   provide, by the latency monitoring plug-in, feedback reporting the latency at the network protocol layer to a quality of service engine that monitors characteristics of the storage layer beneath the network protocol layer such that the quality of service engine learns about the latency at the network protocol layer; and
   adjust, by the quality of service engine, a calculation of system capacity, based on both the feedback from the latency monitoring plug-in reporting the latency at the network protocol layer and the monitored characteristics of the storage layer beneath the network protocol layer to enable an application to adhere to a service level agreement despite the latency at the network protocol layer;
   wherein:
   the feedback reports an average latency for a multitude of workloads to the quality of service engine;
   adjusting the calculation further comprises calculating a network capacity based on the latency at the network protocol layer as latency perceived by the application and calculating a storage capacity based on the monitored characteristics of the storage layer; and
   the instructions further cause the computing device to select the minimum between the network capacity and the storage capacity as the system capacity to enable the application to adhere to the service level agreement despite the latency at the network protocol layer.

* * * * *